(12) United States Patent
Rodin et al.

(10) Patent No.: US 7,260,814 B2
(45) Date of Patent: Aug. 21, 2007

(54) OPC EDGE CORRECTION BASED ON A SMOOTHED MASK DESIGN

(75) Inventors: Sergei Rodin, Moscow (RU); Stanislav V. Aleshin, Moscow (RU); Marina Medvedeva, Moscow (RU)

(73) Assignee: LSI Corporation, Milpitas, CA (US)

( * ) Notice: Subject to any disclaimer, the term of this patent is extended or adjusted under 35 U.S.C. 154(b) by 129 days.

(21) Appl. No.: 11/012,618

(22) Filed: Dec. 14, 2004

(65) Prior Publication Data

US 2006/0129966 A1    Jun. 15, 2006

(51) Int. Cl.
*G06F 17/50* (2006.01)
(52) U.S. Cl. ........................................ 716/21
(58) Field of Classification Search ............. 716/19–21
See application file for complete search history.

(56) References Cited

U.S. PATENT DOCUMENTS 6,857,109 B2 * 2/2005 Lippincott .................... 716/2
7,073,162 B2 * 7/2006 Cobb et al. .................. 716/20
7,080,849 B2 * 7/2006 Lammer .................... 280/602
2005/0097501 A1 * 5/2005 Cobb et al. .................. 716/21

* cited by examiner

*Primary Examiner*—Stacy A Whitmore
(74) *Attorney, Agent, or Firm*—Strategic Patent Group Inc

(57) ABSTRACT

A method and system is provided for performing edge correction on a mask design. Aspects of the invention include initially fragmenting boundaries of the mask design for optical proximity correction, whereby edge segments of the boundaries are moved by a distance value; interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask; calculating distances between all pairs of comparable edge segments of the smoothed OPC mask; comparing the distances to a design rule limit; for each edge segment having a distance that exceeds the design rule limit, decreasing the segment's distance value; and optimizing the mask design by repeating the above steps until no distance violations are found.

21 Claims, 5 Drawing Sheets

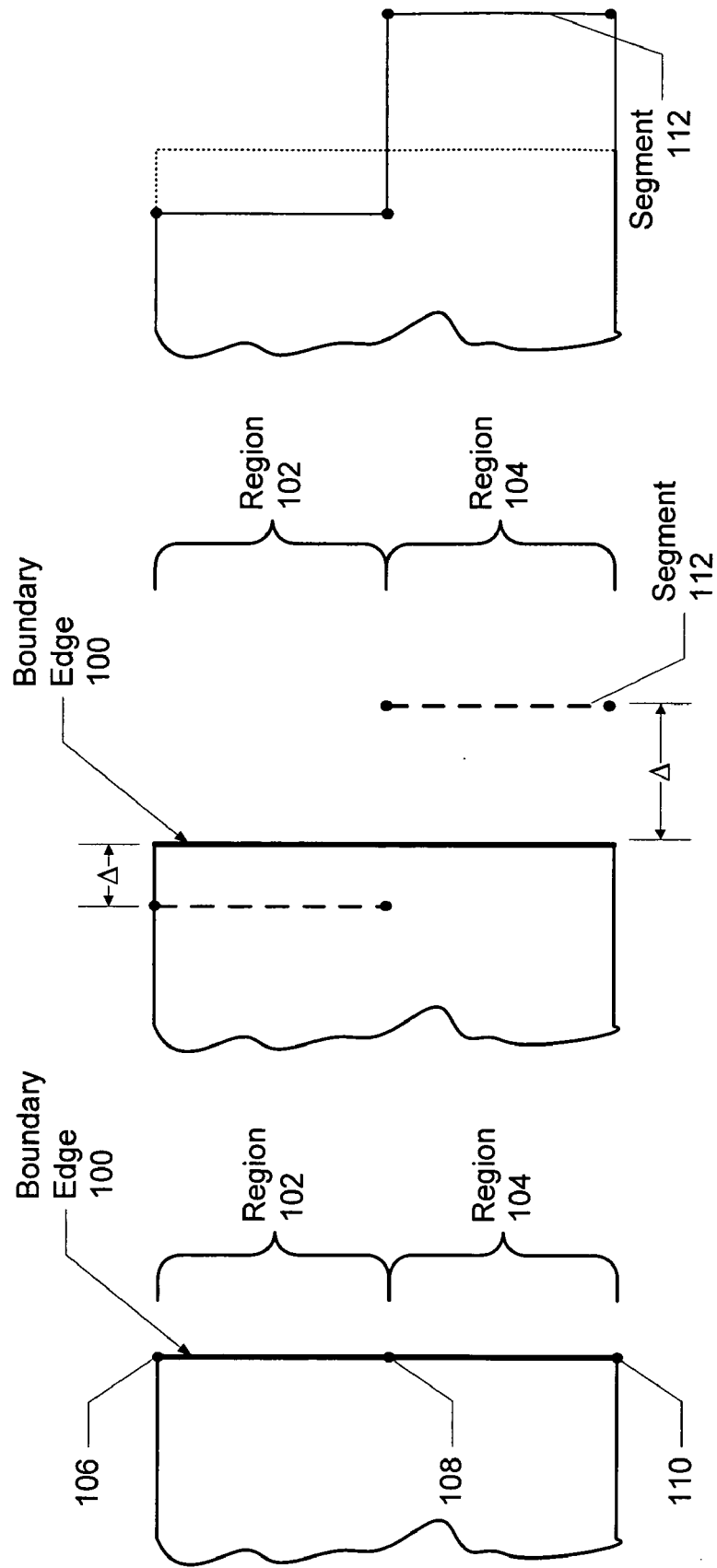

OPC EDGE CORRECTION BASED ON A SMOOTHED MASK DESIGN

FIELD OF THE INVENTION

The present invention relates to optical proximity correction (OPC) in integrated circuit designs, and more particularly to a method and system for performing OPC edge correction based on a smoothed mask design.

BACKGROUND OF THE INVENTION

The minimum feature sizes of integrated circuits (ICs) have been shrinking for years. Commensurate with this size reduction, various process limitations have made IC fabrication more difficult. One area of fabrication technology in which such limitations have appeared is photolithography.

An integral component of photolithographic apparatus is a "reticle" which includes a pattern corresponding to features at one layer in an IC design. As light passes through the reticle, it is refracted and scattered by the chromium edges. This causes the projected image to exhibit some rounding and other optical distortion. While such effects pose relatively little difficulty in layouts with large feature sizes (e.g., layouts with critical dimensions above about 1 micron), they cannot be ignored in layouts having features smaller than about 1 micron. The problems become especially pronounced in IC designs having feature sizes near the wavelength of light used in the photolithographic process.

To remedy this problem, a reticle correction technique known as optical proximity correction (OPC) has been developed. Optical proximity correction involves adding dark regions to and/or subtracting dark regions from a reticle design at locations chosen to overcome the distorting effects of diffraction and scattering. Typically, OPC is performed on a digital representation of a desired IC pattern. First, the digital pattern is evaluated with software to identify regions where optical distortion will result, and a digital representation of a reticle or photomask design is modified to create an optically corrected or OPC mask. The modification is performed by a computer having appropriate software for performing OPC. A mask simulator is then used to emulate the wafer printing characteristics of the OPC mask during optical lithography, resulting in an OPC aerial image. The mask may be corrected by moving portions of the edges as necessary to improve the simulated wafer results.

Before correction of the mask can take place, the boundaries of the mask design must be fragmented into edge segments. The fragmented portions of the boundaries, or edge segments, are then moved to obtain a wafer print image which is the most close to the target design. Usually, the edge segments are moved in a direction normal to the boundary edge, which create fragmentation regions along the mask boundaries. After the moves are calculated, the moves are "applied" to the mask design to obtain the new OPC features. One problem with conventional mask correction techniques is that it makes the OPC mask very complex at locations where fragmentation regions meet at an angle, as shown in FIGS. 1A and 1B.

FIG. 1A is a diagram illustrating a portion of an original mask feature 10 having boundary edges that have been moved to create fragmentation regions 12 and 14. The location where the two fragmentation regions 12 and 14 meet create a jog 16 in the mask geometry that may be too complex for the mask making process to pattern. Therefore, there have been attempts to reduce the number of jogs 16 that are present in the final OPC mask by averaging or smoothing the neighboring fragmentation regions. This is accomplished by connecting the ends of the fragmentation regions 12 and 14 together, as shown in FIG. 1B.

One problem with the above smoothing correction technique is that the fragmentation process may result in a move that violates design rules. For example, a high-density chip design may require a distance of no less than $0.8\lambda$ exist among feature boundaries. It is possible, however, that the edges of the corrected mask are moved in a manner that violates this design rule constraint. Another problem is that most mask design processes require that the boundaries of the mask be in a horizontal, vertical, or 45° orientation. The process for reducing the number of jogs near angles by connecting the ends of fragmentation regions may result in a non-45° geometry, as shown in FIG. 1B, which cannot be used.

Accordingly, what is needed is an improved method and system performing a OPC edge correction based on a smoothed mask design. The present invention addresses such a need.

BRIEF SUMMARY OF THE INVENTION

The present invention provides a method and system for performing edge correction on a mask design. Aspects of the invention include initially fragmenting boundaries of the mask design for optical proximity correction, whereby edge segments of the boundaries are moved by a distance value; interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask; calculating distances between all pairs of comparable edge segments of the smoothed OPC mask; comparing the distances to a design rule limit; for each edge segment having a distance that exceeds the design rule limit, decreasing the segment's distance value; and optimizing the mask design by repeating the above steps until no distance violations are found.

BRIEF DESCRIPTION OF THE DRAWINGS

FIGS. 4A-4C are diagrams showing an example of initial fragmentation performed on an input mask design.

DETAILED DESCRIPTION OF THE INVENTION

The present invention relates to a method and system for performing OPC edge correction based on a smoothed mask design. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
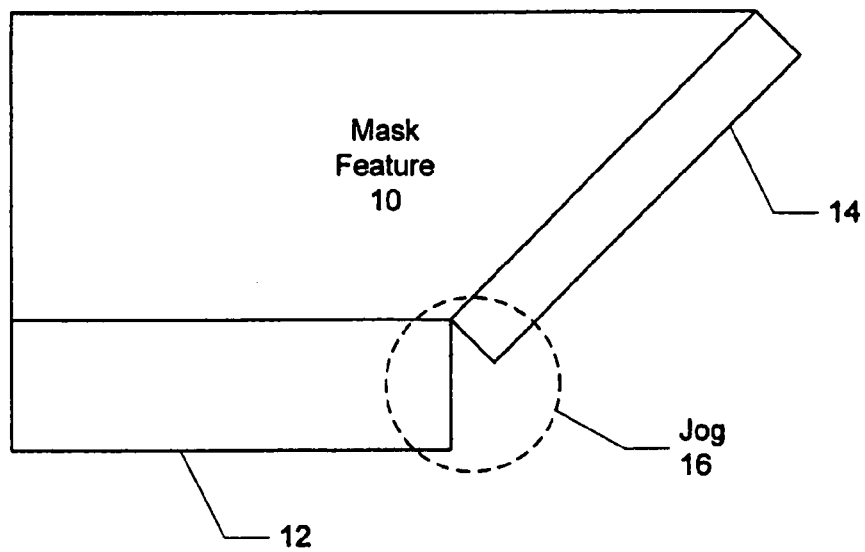
FIG. 1A is a diagram illustrating a portion of an original mask feature having boundary edges that have been moved to create fragmentation regions.
Figure 1B:
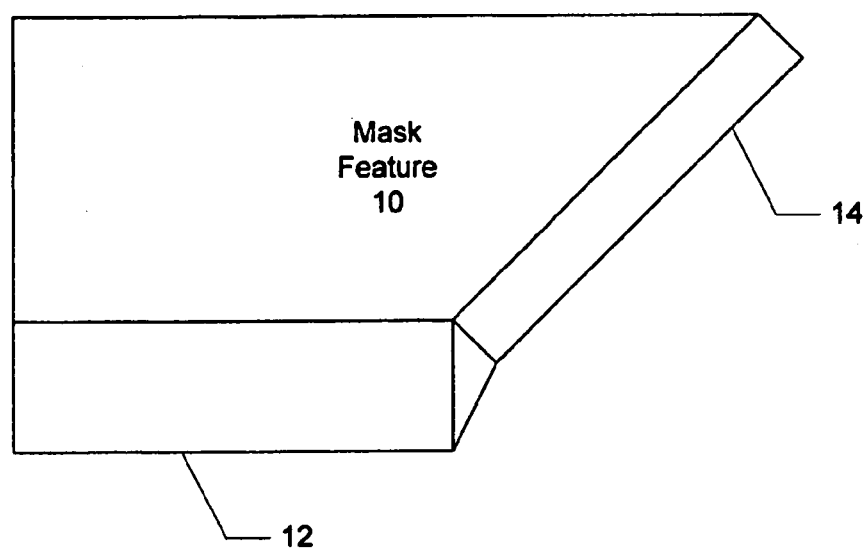
FIG. 1B is a diagram showing a conventional process for reducing the number of jogs near angles by connecting the ends of fragmentation regions that may result in a non-45° geometry.
Figure 2:
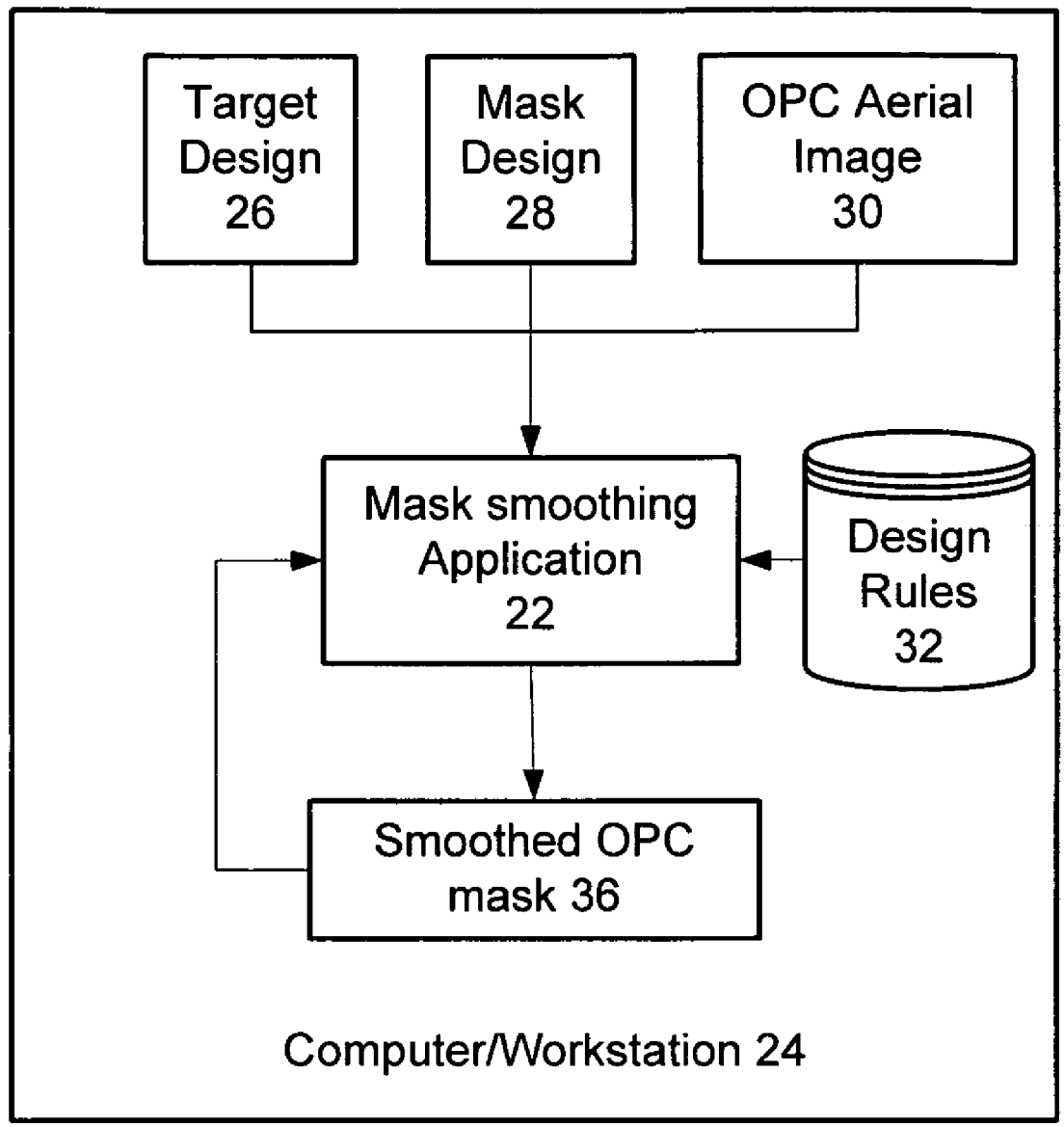
FIG. 2 is a block diagram illustrating a system for performing OPC edge correction based on an edge corrected smoothed mask design according to a preferred embodiment of the present invention.

FIG. 2 is a block diagram illustrating a system for performing OPC edge correction based on an edge corrected smoothed mask design according to a preferred embodiment of the present invention. The system 20 includes a mask smoothing application 22 executing on processor in a computer/workstation 24 or a server that is accessed over a network (not shown). The workstation 24 preferably includes a microprocessor that is coupled to a non-volatile storage device, e.g., a conventional hard disk storage device. The microprocessor and the hard disk storage device are coupled to a volatile storage device, e.g. a random access memory (RAM). A monitor may be coupled to the workstation for displaying a user interface.

Inputs to the mask smoothing application 22 may include a target design 26, an uncorrected mask design 28, an OPC aerial image 30, and design rules 32. Preferably, both the target design 26 and the mask design 28 are described in an electronic format, e.g., GDS II which may represent individual features in the design as a set of x, y points. The OPC aerial image 30 emulates the wafer printing characteristics of an OPC mask during optical lithography. The uncorrected mask design 28 is defined with boundaries matching the desired boundaries of the features to be formed on a substrate in a photolithographic process as defined in the target design 26. However, these features may be distorted during the photolithographic process due to like diffraction and/or diffusion of the photo resist image, resulting in feature boundaries on the substrate that do not match those of the uncorrected mask.

According to the present invention, the mask smoothing application 22 calculates edge moves for the mask design 28 to and/or subtract regions from the mask design 28 at locations chosen to overcome the distorting effects of diffraction and scattering. The mask smoothing application 22 analyzes characteristics of the moved segments, and iteratively modifies their endpoints if necessary to obtain a smoothed mask design 36 that reduces the number of jogs occurring in the output of mask design in the location of angles, while meeting design rule limitations.

Figure 3:
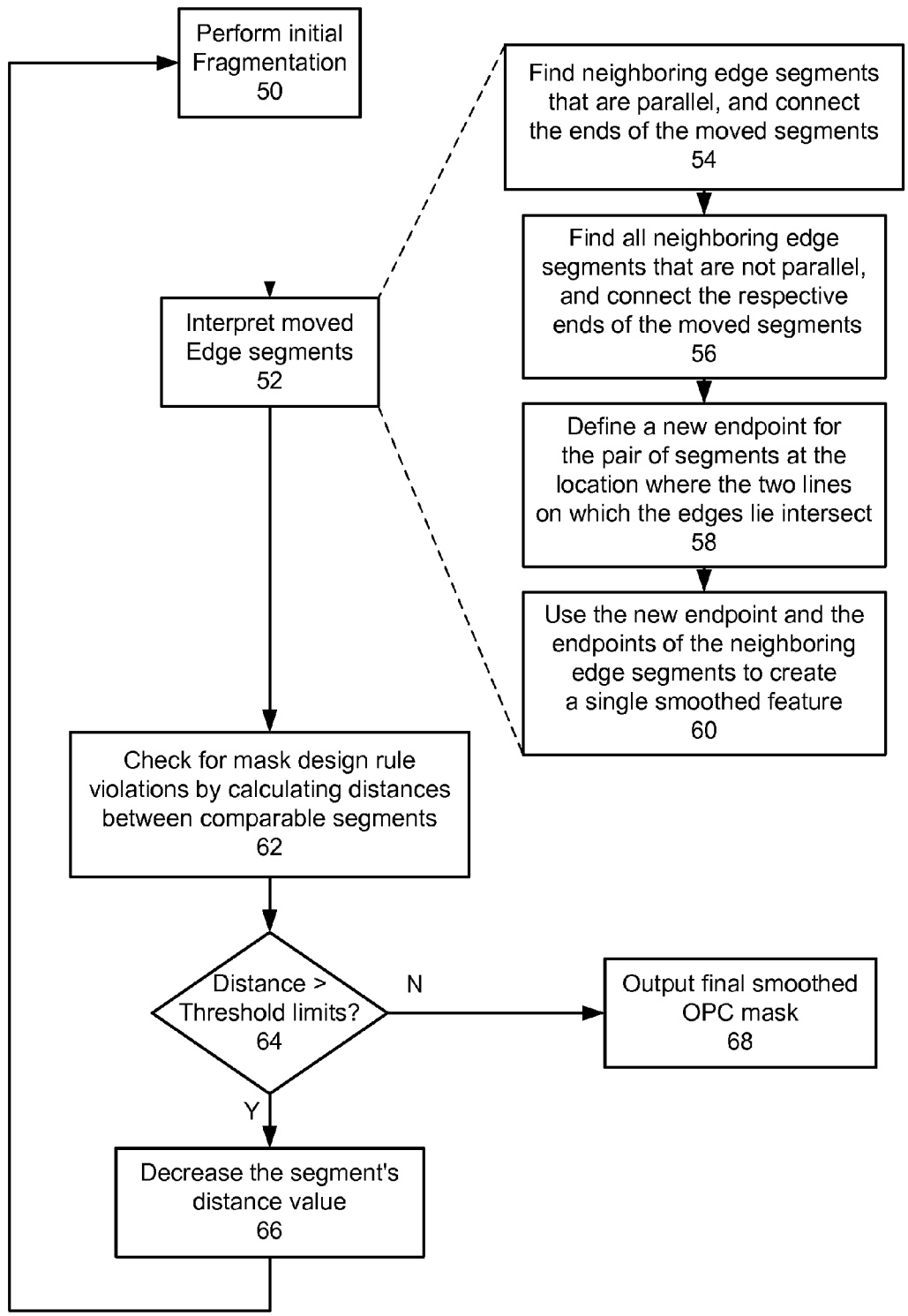
FIG. 3 is a flow diagram illustrating the process for performing optical proximity correction based on an edge corrected smoothed mask design in accordance with a preferred embodiment.

FIG. 3 is a flow diagram illustrating the process for performing optical proximity correction based on an edge corrected smoothed mask design in accordance with a preferred embodiment. The process begins in step 50 by initially fragmenting boundaries of the input mask design 28 to calculate edge moves for optical proximity correction. Many methods may be used to perform fragmentation, such as an iterative procedure as described in patent application Ser. No. 09/879,664 entitled "Mask Correction for Photolithographic Processes," (01-026) filed on Jun. 12, 2001, or the process described in patent application Ser. No. 10/740,359 entitled "Gradient Method of Mask and Correction," (03-2247) filed on Dec. 18, 2003, both herein incorporated by reference.

FIGS. 4A and 4B are diagrams showing an example of initial fragmentation performed on an input mask design. During fragmentation, a boundary edge 100 is divided into a plurality of regions 102 and 104. Each region is part of the boundary edge 100 and has x, y coordinates at beginning and endpoints. Region 102 has a beginning point 106 and an endpoint 108, and a region 104 has a beginning point 108 and an endpoint 110. As shown in FIG. 4B, edge segments 112 defined between the beginning points 108 and endpoints 110 of each region 102 and 104 are moved normal (i.e., perpendicular) to the boundary edge 100 by a distance value, Δ, either inside or outside the boundary edge 100.

Referring again to FIG. 3, after initial fragmentation, step 52 is performed in which the moved edge segments are interpreted to create an initial smoothed OPC design 36. Given the moved edge segments for solving the OPC task calculated above, the interpretation process analyzes characteristics of the moved segments and modifies their endpoints if necessary to obtain a smoothed mask design that reduces the number of jogs occurring in the output of mask design, particularly in the location of angles, while meeting design rule limitations. The process assumes of course that the input design has no such violations.

According to one aspect of the preferred embodiment, the interpretation process includes step 54, in which neighboring edge segments that are parallel are found, and new features are created by connecting the respective endpoints of the moved segments, as shown in FIG. 4C. In step 56, neighboring edge segments that are not parallel are found (i.e., neighboring segments that meet at an angle). According to one aspect of present invention, rather than simply connecting the endpoints of a moved edge segment with the neighboring segments, which can create non-45° geometry, the present invention performs angle interpretation in a manner that smooths neighboring segments such that the 45° angle among the neighboring edge segments is maintained. This is accomplished in step 58 by defining a new endpoint for each pair of edge segments in a location where the two lines on which the two edge segments lie intersect.

Figure 5A:
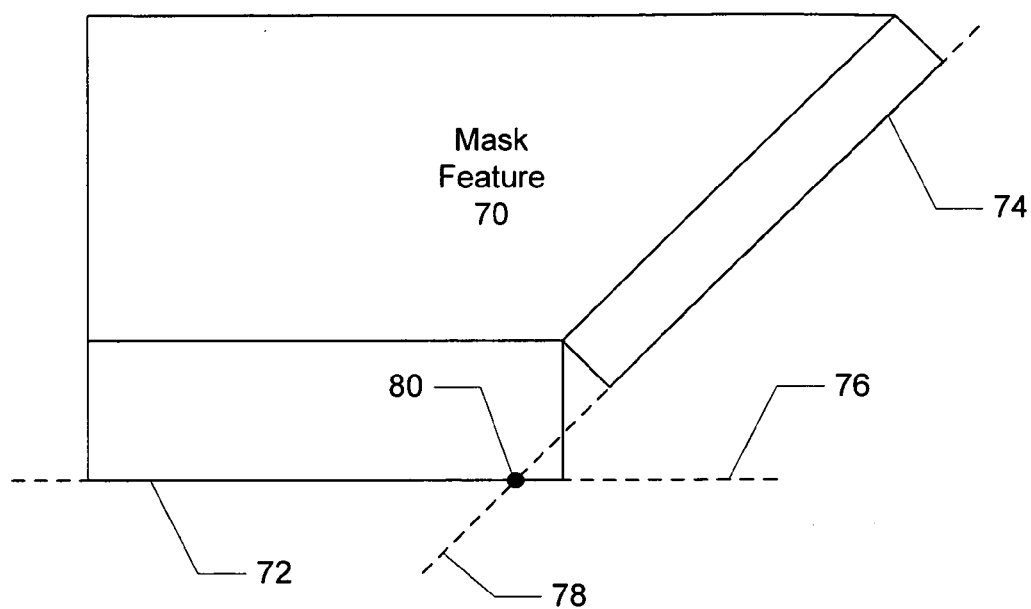
FIG. 5A is a block diagram illustrating the defining of a new endpoint for a pair of neighboring segments that meet at an angle according to the angle interpretation process of the present invention.

FIG. 5A is a block diagram illustrating the defining of a new endpoint for a pair of neighboring segments that meet at an angle according to the angle interpretation process of the present invention. Neighboring edge segments 72 and 74 are shown that meet at a 45° angle. Neighboring edge segments 72 lies on line 76 and edge segments 74 lies on line 78. Using geometry calculations, the point at which the two lines 72 and 76 intersect can be determined. This point is defined as the new endpoint 80 for edge segments 72 and 74.

Figure 5B:
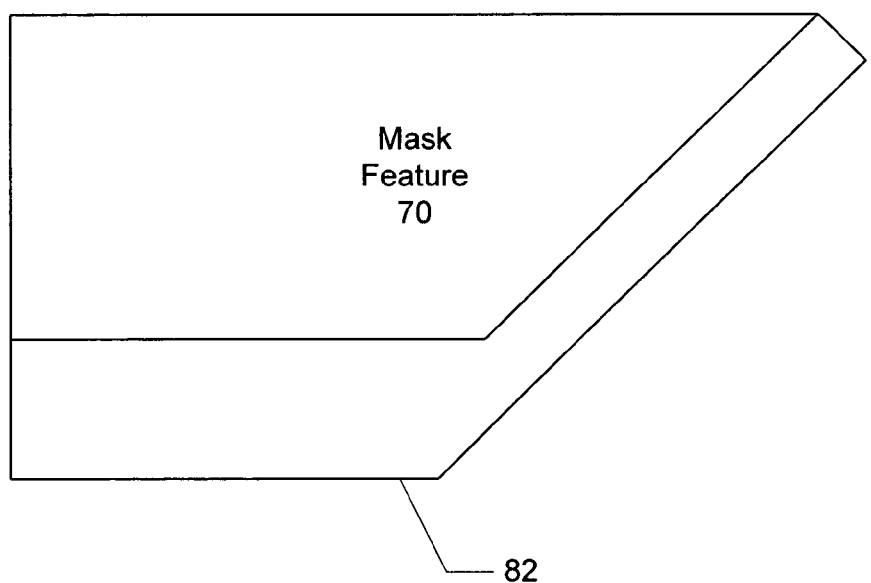
FIG. 5B is a diagram illustrating the creation of a single smoothed feature from the establishment of a endpoint.

Referring again to FIG. 3, after the new endpoint 80 is defined, in step 58, the new endpoint 80 and the other beginning points and endpoints of the edge segments are connected to create a single smoothed feature 82, as shown in FIG. 5B.

The space between features cannot be less than some threshold value, which is referred to as a space technology limit, and a feature cannot be thicker than some threshold i.e., called a size technology limit, both of which are defined in the design rules 32. But during the search for the best edge moves, the technology limits are not a consideration. Therefore, according to a further aspect of present invention, the mask smoothing application 22 automatically corrects the moves made during the fragmentation and interpretation steps if there is any design rule violation.

Referring to FIG. 3, the mask smoother application 22 begins checking for mask design rule violations in step 62 by calculating distances between all pairs of "comparable" segments of the smoothed OPC mask. In step 64, the distances are then compared the design rule threshold limits.

In step 66, for each segment determined to have a distance exceeding a design rule limit, the segment's move is changed by decreasing its distance value. In a preferred embodiment, this is accomplished by finding the edge segments that give rise to a design rule violation, and for each found edge segment, finding a maximum violation value, which is the difference between the technology limit and the calculated distance. The segment's distance value is then decreased by ¼ of the maximum violation value each iteration.

The OPC corrections to the mask design are optimized by repeating steps 50-66 until no distance violations are found. When that occurs, the final version the smoothed OPC mask 36 is output for simulation and fabrication in step 68.

A further aspect of the present invention is the process by which the mask smoothing application 22 determines which segments to compare for design rule violations. In a preferred embodiment, the mask smoothing application 22 performs the process on each feature in the mask design 36 and begins by traversing the x, y points comprising the feature and connecting each neighboring pair of points to define respective segments, wherein a set of contiguous segments form a step if the x values of the segments/points all increase or decrease and the same is true for the y values. The mask smoothing application 22 traverses the x, y points with the assumption that every feature in the design 36 is oriented clockwise. The x, y points for added/subtracted features for moved edge segments may be modified using the new endpoints, as described above. In a preferred embodiment, a step is defined as:

using segments $S_1=(a_1, a_2)$, $S_2=(a_2, a_3)$, ..., $S_n=(a_n, a_{n+1})$, where each point $a_i$ has the coordinates $x_i, y_i$, $1 \leq i \leq n$, a step is created from the segments if:

$$\sum_1 |x_{i+1} - x_1| = \left|\sum_1 x_{i+1} - x_1\right| \text{ and } \sum_1 |y_{i+1} - y_1| = \left|\sum_1 y_{i+1} - y_1\right|$$

Given this the definition of a step, two segments S1 and S2 from the smoothed OPC mask 36 are comparable if they are not non-comparable, wherein the segments S1 and S2 are non-comparable if the following are true:

the beginning point of S1 is equal to the endpoint of S2, or the beginning point of S2 is equal to the endpoint of S1;

the segments S1 and S2 have the same direction;

if there is a segment S3 such that the beginning point of S3 is equal to the endpoint of S2 and the endpoint of S3 is equal to the beginning point of S1, or the beginning point of S3 is equal to the endpoint of S1 and the endpoint of S3 is equal to the beginning point of S2, and the segments S1 and S2 are not opposite; and if the segments S1 and S2 are the edges of one feature and the shortest path connecting segments S1 and S2 along the feature form a step.

A method and system for performing OPC edge correction based on a smoothed mask design has been disclosed. The present invention has been described in accordance with the embodiments shown, and one of ordinary skill in the art will readily recognize that there could be variations to the embodiments, and any variations would be within the spirit and scope of the present invention. For example, the various steps shown in FIG. 3 may be performed by any number of software applications, rather than only by the mask smoothing application. Accordingly, many modifications may be made by one of ordinary skill in the art without departing from the spirit and scope of the appended claims.

We claim:

1. A method for performing edge correction on a mask design, comprising;
    a) initially fragmenting boundaries of the mask design for optical proximity correction, whereby edge segments of the boundaries are moved by a distance value;
    b) interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask;
    c) calculating distances between all pairs of comparable edge segments of the smoothed OPC mask;
    d) comparing the distances to a design rule limit;
    e) for each edge segment having a distance that exceeds the design rule limit, decreasing the segment's distance value; and
    f) optimizing the mask design by repeating (a)-(f) until no distance violations are found.

2. The method of claim 1 wherein the interpreting (b) further includes: finding neighboring edge segments that are parallel, and creating new features by connecting respective endpoints of the moved edge segments.

3. The method of claim 2 wherein the interpreting (b) further includes: connecting the new endpoint and other endpoints of the moved edge segments to create a single smoothed feature.

4. The method of claim 1 wherein the decreasing (e) further includes: including in the design rule limit a space technology limit threshold and a size technology limit threshold.

5. The method of claim 4 wherein the decreasing (e) further includes: finding the edge segments that give rise to a design rule violation, and for each found edge segment, finding a maximum violation value, which is the difference between the technology limit and the calculated distance.

6. A method for performing edge correction on a mask design, comprising:
    (a) initially fragmenting boundaries of the mask design for optical proximity correction, whereby edge segments of the boundaries are moved by a distance value;
    (b) interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask;
    (c) calculating distances between all pairs of comparable edge segments of the smoothed OPC mask;
    (d) comparing the distances to a design rule limit;
    (e) for each edge segment, including in the design rule limit a space technology limit threshold and a size technology limit threshold, finding the edge segments that give rise to a design rule violation, for each found edge segment, finding a maximum violation value, which is the difference between the technology limit and the calculated distance, and decreasing the edge segment's distance value by ¼ of the maximum violation value each iteration; and (f) optimizing the mask design by repeating (a)-(f) until no distance violations are found.

7. A method for performing edge correction on a mask design, comprising:
(a) initially fragmenting boundaries of the mask design for optical proximity correction, whereby edge segments of the boundaries are moved by a distance value;
(b) interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask:
(c) calculating distances between all pairs of comparable edge segments of the smoothed OPC mask, comprising: traversing the x, y points with the assumption that every feature in the smoothed mask design is oriented clockwise, and defining a step as:
using segments $S_1=(a_1, a_2)$, $S_2,=(a_2, a_3)$, . . . , $S_n=(a_n, a_{n+1})$, where each point $a_i$ has the coordinates $x_i$, $y_i$, $1 \leq i \leq n$, a step is formed if:

$$\sum_1 |x_{i+1} - x_1| = \left|\sum_1 x_{i+1} - x_1\right| \text{ and } \sum_1 |y_{i+1} - y_1| = \left|\sum_1 y_{i+1} - y_1\right|.$$

(d) comparing the distances to a design rule limit;
(e) for each edge segment having a distance that exceeds the design rule limit, decreasing the segment's distance value; and
(f) optimizing the ask design by repeating (a)-(f) until no distance violations are found.

8. The method of claim 7 further including: defining two segments S1 and S2 from the smoothed OPC mask as comparable if they are not non-comparable, wherein the segments S1 and S2 are non-comparable if the following are true:
the beginning point of S1 is equal to the endpoint of S2, or the beginning point of S2 is equal to the endpoint of S1;
the segments S1 and S2 have the same direction;
if there is a segment S3 such that the beginning point of S3 is equal to the endpoint of S2 and the endpoint of S3 is equal to the beginning point of S1, or the beginning point of S3 is equal to the endpoint of S1 and the endpoint of S3 is equal to the beginning point of S2, and the segments S1 and S2 are not opposite; and
if the segments S1 and S2 are the edges of one feature and the shortest path connecting segments S1 and S2 along the feature form a step.

9. The method of claim 1 wherein the fragmenting (a) further includes:
i) dividing a boundary edge of a feature into a plurality of regions, each region having a beginning point and an endpoint;
ii) defining an edge segment between the beginning point and endpoint of each region; and
iii) moving each segment normal to the boundary edge by the distance value.

10. An OPC edge correction system, comprising:
a mask design in an electronic format; and
a mask smoothing software application executing on processor for performing
optical proximity correction on the mask design by,
a) initially fragmenting boundaries of the mask design, whereby edge segments of the boundaries are moved by a distance value;
b) interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask;
c) calculating distances between all pairs of comparable edge segments of the smoothed OPC mask;
d) comparing the distances to a design rule limit;
e) for each edge segment having a distance that exceeds the design rule limit, decreasing the segment's distance value; and
f) optimizing the mask design by repeating (a)-(f) until no distance violations are found.

11. The system of claim 10 wherein the interpreting (b) further includes: finding neighboring edge segments that are parallel, and creating new features by connecting respective endpoints of the moved edge segments.

12. The system of claim 11 wherein the interpreting (b) further includes: connecting the new endpoint and other endpoints of the moved edge segments to create a single smoothed feature.

13. The system of claim 10 wherein the decreasing (e) further includes: including in the design rule limit a space technology limit threshold and a size technology limit threshold.

14. The system of claim 13 wherein the decreasing (e) further includes: finding the edge segments that give rise to a design rule violation, and for each found edge segment, finding a maximum violation value, which is the difference between the technology limit and the calculated distance.

15. An OPC edge correction system, comprising:
a mask design in an electronic format; and
a mask smoothing software application executing on processor for performing optical proximity correction on the mask design by,
(a) initially fragmenting boundaries of the mask design, whereby edge segments of the boundaries are moved by a distance value;
(b) interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask;
(c) calculating distances between all pairs of comparable edge segments of the smoothed OPC mask;
(d) comparing the distances to a design rule limit;
(e) for each edge segment, including in the design rule limit a space technology limit threshold and a size technology limit threshold,
finding the edge segments that give rise to a design rule violation, and for each found edge segment, finding a maximum violation value, which is the difference between the technology limit and the calculated distance, and
decreasing the edge segment's distance value by ¼ of the maximum violation value each iteration;
(f) optimizing the mask design by repeating (a)-(f) until no distance violations are found.

16. An OPC edge correction system, comprising:
a mask design in an electronic format; and a mask smoothing software application executing on processor for performing optical proximity correction on the mask design by,
(a) initially fragmenting boundaries of the mask design, whereby edge segments of the boundaries are moved by a distance value;
(b) interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask;
(c) calculating distances between all pairs of comparable edge segments of the smoothed OPC mask, including traversing the x, y points with the assumption that every feature in the smoothed mask design is oriented clockwise, and defining a step as: using segments $S_1=(a_1, a_2)$, $S_2=(a_2, a_3)$, ..., $S_n=(a_n, a_{n+1})$, where each point $a_i$ has the coordinates $x_i$, $y_i$, $1 \leq i \leq n$, a step is formed if:

$$\sum_1 |x_{i+1} - x_1| = \left|\sum_1 x_{i+1} - x_1\right| \text{ and } \sum_1 |y_{i+1} - y_1| = \left|\sum_1 y_{i+1} - y_1\right|.$$

(d) comparing the distances to a design rule limit;
(e) for each edge segment having a distance that exceeds the design rule limit, decreasing the segment's distance value; and
(f) optimizing the mask design by repeating (a)-(f) until no distance violations are found.

17. The system of claim 16 further including: defining two segments S1 and S2 from the smoothed OPC mask as comparable if they are not non-comparable, wherein the segments S1 and S2 are non-comparable if the following are true:
the beginning point of S1 is equal to the endpoint of S2, or the beginning point of S2 is equal to the endpoint of S1;
the segments S1 and S2 have the same direction;
if there is a segment S3 such that the beginning point of S3 is equal to the endpoint of S2 and the endpoint of S3 is equal to the beginning point of S1, or the beginning point of S3 is equal to the endpoint of S1 and the endpoint of S3 is equal to the beginning point of S2, and the segments S1 and S2 are not opposite; and
if the segments S1 and S2 are the edges of one feature and the shortest path connecting segments S1 and S2 along the feature form a step.

18. The system of claim 10 wherein the fragmenting (a) further includes:
 i) dividing a boundary edge of a feature into a plurality of regions, each region having a beginning point and an endpoint;
 ii) defining an edge segment between the beginning point and endpoint of each region; and
 iii) moving each segment normal to the boundary edge by the distance value.

19. A computer-readable medium containing program instructions for performing edge correction on a mask design, the program instructions for:
 a) initially fragmenting boundaries of the mask design for optical proximity correction, whereby edge segments of the boundaries are moved by a distance value;
 b) interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask;
 c) calculating distances between all pairs of comparable edge segments of the smoothed OPC mask;
 d) comparing the distances to a design rule limit;
 e) for each edge segment having a distance that exceeds the design rule limit, decreasing the segment's distance value; and
 f) optimizing the mask design by repeating instructions (a)-(f) until no distance violations are found.

20. A method for performing edge correction on a mask design, comprising;
 a) initially fragmenting boundaries of the mask design for optical proximity correction, whereby edge segments of the boundaries are moved by a distance value; and
 b) interpreting the moved edge segments by defining a new endpoint for respective pairs of neighboring edge segments that meet at an angle, the endpoint being a location of where lines on which the edge segments lie intersect, wherein the new endpoint is used to create a smoothed feature, resulting in a smoothed OPC mask.

21. The method of claim 20 further including:
 c) calculating distances between all pairs of comparable edge segments of the smoothed OPC mask;
 d) comparing the distances to a design rule limit;
 e) for each edge segment having a distance that exceeds the design rule limit, decreasing the segment's distance value; and
 f) optimizing the mask design by repeating (a)-(f) until no distance violations are found.

* * * * *